(12) United States Patent
Fujii et al.

(10) Patent No.: US 11,775,967 B2
(45) Date of Patent: Oct. 3, 2023

(54) TRANSACTION DELEGATION METHOD, TRANSACTION DELEGATION SYSTEM, AND COMPUTER READABLE MEDIUM

(71) Applicant: SIVIRA Inc., Osaka (JP)

(72) Inventors: Takashi Fujii, Osaka (JP); Toshihiko Ryugo, Osaka (JP); Motoki Sato, Osaka (JP)

(73) Assignee: SIVIRA Inc., Osaka (JP)

( * ) Notice: Subject to any disclaimer, the term of this patent is extended or adjusted under 35 U.S.C. 154(b) by 0 days.

(21) Appl. No.: 17/788,491

(22) PCT Filed: Dec. 24, 2020

(86) PCT No.: PCT/JP2020/048410
§ 371 (c)(1),
(2) Date: Jun. 23, 2022

(87) PCT Pub. No.: WO2021/132454
PCT Pub. Date: Jul. 1, 2021

(65) Prior Publication Data
US 2023/0041182 A1    Feb. 9, 2023

Related U.S. Application Data

(60) Provisional application No. 62/953,734, filed on Dec. 26, 2019.

(51) Int. Cl.
*G06Q 20/38*     (2012.01)
*G06Q 20/06*     (2012.01)
(Continued)

(52) U.S. Cl.
CPC ....... *G06Q 20/3825* (2013.01); *G06Q 20/065* (2013.01); *G06Q 20/3821* (2013.01)

(58) Field of Classification Search
CPC ............ G06Q 20/3825; G06Q 20/065; G06Q 20/3821
(Continued)

(56) References Cited

U.S. PATENT DOCUMENTS 11,361,289 B1 *  6/2022  Housser ................ G06Q 20/10
2017/0134280 A1   5/2017  Davis
(Continued)

FOREIGN PATENT DOCUMENTS

| JP | 2017-207979 A | 11/2017 |
| JP | 2018-055203 A | 4/2018 |
| JP | 2019-503099 A | 1/2019 |
| JP | 2020-080061 A | 5/2020 |
| WO | WO2018056445 A1 | 3/2018 |

OTHER PUBLICATIONS

Mujagic et al. "Building Own Blockchain", 2019 Association for Computing Machinery, Oct. 21, 2019, pp. 8-14 (Year: 2019).*
(Continued)

*Primary Examiner* — James D Nigh
(74) *Attorney, Agent, or Firm* — Bret E. Field; Bozicevic, Field & Francis LLP

(57) ABSTRACT

Provided are a transaction delegation method, a transaction delegation system, and a computer readable medium storing a computer program. In this transaction delegation method: a second device that stores account data in a blockchain system receives, through communication outside the blockchain system, delegation data from a first device used by a user, the delegation data being for delegating execution of a desired transaction of the user in the blockchain system; a delegation transaction that causes an execution smart contract executing a transaction based on an account of the user in the blockchain system to execute the desired transaction is created on the basis of the delegation data transmitted from the first device; and the delegation transaction with payment of a fee token or a utility token required for (Continued)

executing a transaction is broadcast to the blockchain system on the basis of the account data.

13 Claims, 13 Drawing Sheets

(51) Int. Cl.
    *G06Q 20/08*     (2012.01)
    *G06Q 20/02*     (2012.01)
    *G06F 16/182*     (2019.01)

(58) Field of Classification Search
    USPC .......................................................... 705/64
    See application file for complete search history.

(56) References Cited

U.S. PATENT DOCUMENTS

| | | | |
|---|---|---|---|
| 2020/0058023 A1* | 2/2020 | Travizano | H04L 9/3239 |
| 2022/0004562 A1 | 1/2022 | Watanabe et al. | |
| 2022/0261882 A1* | 8/2022 | Youb | G06Q 20/065 |

OTHER PUBLICATIONS

English translation of International Search Report for PCT Application No. PCT/JP2020/48410 dated Feb. 22, 2021, 2 pages.

\* cited by examiner

User determines or creates

A: data for specifying the blockchain account

B: data for configuring the transaction to be executed by a executor account contract Method of validating (for example, an electronic signature) that the user oneself designed A and B is provided.

(2)

A and B are transmitted from the user to the relayer.

(3)

The relayer creates new delegation transaction (delegation tx) in which A and B are embedded, and
broadcasts the delegation transaction to the blockchain system.

(4)

The transaction (user tx) that the user desires to execute is requested (executed) by the executor account contract.

(Token required for execution of the transaction (user tx) that the user desires to execute is paid from an account designated by relayer.)

TRANSACTION DELEGATION METHOD, TRANSACTION DELEGATION SYSTEM, AND COMPUTER READABLE MEDIUM

CROSS-REFERENCE TO RELATED APPLICATIONS

This application is the national phase under 35 U. S. C. § 371 of PCT International Application No. PCT/JP2020/048410 which has an International filing date of Dec. 24, 2020 and designated the United States of America.

FIELD

This application claims the benefit of the priority right of U.S. Provisional Patent Application No. 62/953,734 filed on Dec. 26, 2019, which is incorporated by reference in its entirety.

The present invention relates to a transaction delegation method, a transaction delegation system, and a computer readable medium storing a computer program in a blockchain.

BACKGROUND

In a blockchain system using a blockchain, if a user requests a transaction to a node or a smart contract configuring the blockchain system, it is necessary to pay a fee for a fee token in compensation for the transaction.

The transaction to be requested in the blockchain system includes not only a transaction for transferring an asset (such as crypto-assets), but also data storage or calculation executed by the smart contract.

In the blockchain system using the blockchain, there is a smart contract for requesting the payment of a utility token when using the blockchain system, in addition to the fee token as described above.

SUMMARY

In order to use a service based on a blockchain technology, it is necessary for some users to manage the complexities of using fee token, utility token, and the like, and thus, widespread dissemination of the blockchain system is less likely to be explosive.

The present invention has been made in consideration of such circumstances, and an object thereof is to provide a transaction delegation method, a transaction delegation system, and a computer readable medium storing a computer program for supporting the dissemination of a blockchain system.

A transaction delegation method of one embodiment of the present disclosure, includes: receiving delegation data by a second device storing account data in a blockchain system through communication outside the blockchain system from a first device used by a user, the delegation data being for delegating execution of a desired transaction of the user in the blockchain system; creating a delegation transaction that causes an execution smart contract executing a transaction based on an account of the user in the blockchain system to execute the desired transaction on the basis of the delegation data transmitted from the first device; and broadcasting the delegation transaction with payment of a fee token or a utility token required for executing a transaction to the blockchain system on the basis of the account data.

According to the present disclosure, a user receiving a service can enjoy the service without being aware of the operation of an account in a blockchain system on which the service is based and a token distributed in the blockchain system.

The above and further objects and features of the invention will more fully be apparent from the following detailed description with accompanying drawings.

BRIEF DESCRIPTION OF THE DRAWINGS

FIG. 2 is a schematic view of a procedure of transaction delegation processing in the system of the present disclosure.

DETAILED DESCRIPTION

Figure 1:
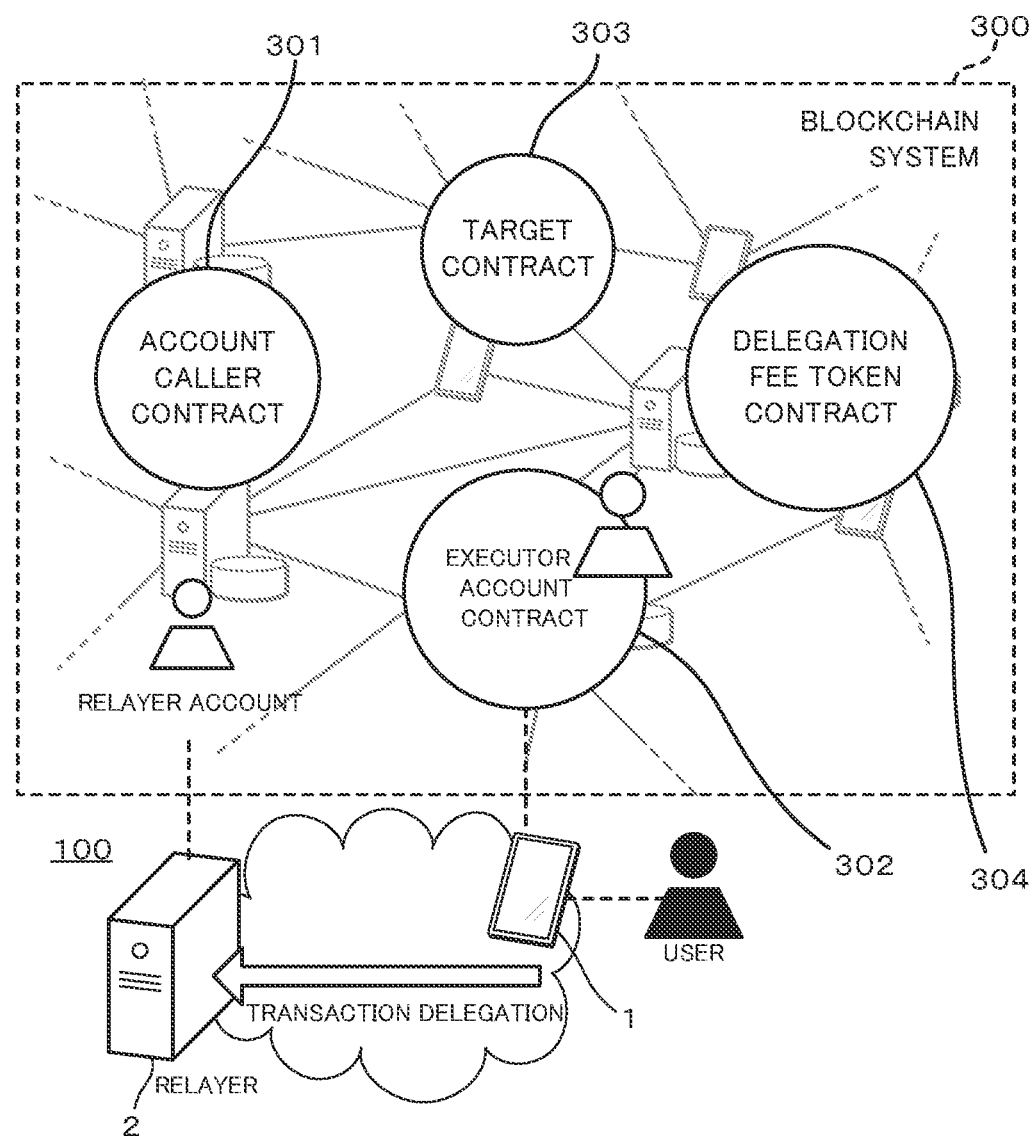
FIG. 1 is a schematic view of a system of the present disclosure.

The present disclosure will be described in detail with reference to the drawings illustrating embodiments of the present disclosure.

In the present disclosure, a "blockchain system" indicates a system that includes a plurality of computers capable of performing communication connection to each other and a network for connecting the plurality of computers, and creates a blockchain by distributed processing of the plurality of computers. In the blockchain, the content of a transaction to be requested is imported.

In the blockchain system using the blockchain, if a first device of a user requests a transaction to the blockchain system, it is necessary to pay a fee for a specific token (a fee token) according to a blockchain technology, as compensation.

For example, in a Bitcoin (Registered Trademark)-based blockchain system, if the user requests asset transfer (trade registration) processing, a balance amount is provided between the input and the output of the transaction, and a fee for the balance amount in BTC unit is paid to a miner. In an Ethereum (Registered Trademark)-based blockchain system, when executing the transaction, a fee in ETH unit that corresponds to the amount of gas required to import the transaction into the blockchain is paid to the miner, in accordance with the designated cost of gas. In both of Bitcoin-based blockchain system and Ethereum-based blockchain system, a transaction with a low fee is less likely to be imported into the blockchain.

In an EOS-based blockchain system, it is necessary for a request subject of the transaction to ensure storage capacity required for the transaction and a calculation (computing) resource in advance. Specifically, it is necessary for the user requesting the transaction to purchase the storage capacity in the blockchain system with an EOS token and to stake (deposit) the EOS token with respect to a blockchain account for executing processing through the device used by the user.

In order to continuously operate the blockchain system using the blockchain, a mechanism for requesting the payment of such a fee is important from the viewpoint of improving incentive design or DOS attack resistance. In order to use the service, it is necessary for the user to perform token management such as purchasing and sending a necessary token (the fee token or the utility token) with the account of the blockchain system through an exchange. Some services may issue and distribute a special token, but even if there is such a special token, it may be necessary to perform the transaction with the fee token or the utility token. The management of various tokens requires highly professional knowledge, which is a high hurdle for the general user. A situation where a user not familiar with a blockchain technology does not use the service using the blockchain is a major challenge to mass-adaptation of the blockchain.

A transaction delegation method of the present disclosure, includes: receiving delegation data by a second device storing account data in a blockchain system through communication outside the blockchain system from a first device used by a user, the delegation data being for delegating execution of a desired transaction of the user in the blockchain system; creating a delegation transaction that causes an execution smart contract executing a transaction based on an account of the user in the blockchain system to execute the desired transaction on the basis of the delegation data transmitted from the first device; and broadcasting the delegation transaction with payment of a fee token or a utility token required for executing a transaction to the blockchain system on the basis of the account data.

In the transaction delegation method of the present disclosure, a device (the first device) used by the user who actually receives the service is capable of delegating a transaction (a user transaction, hereinafter, also referred to as user tx) that the user desires to execute to a device (the second device) of a relayer who possesses the fee token or the utility token in the blockchain system for attaining the service, that is, performing transaction delegation (tx delegation).

Accordingly, even if there is no privilege (an account) for managing the fee token or the utility token required for the transaction (user tx) that the user desires to execute, it is possible to obtain an execution result of the transaction. It is not necessary for the user to be aware of the operation of the fee token or the utility token in the blockchain on which the service is based. An arbitrary token with a privilege is used as a delegation fee token, or it is not necessary to pay a delegation fee.

The transaction delegation (tx delegation) is executed outside the blockchain, and the format is not limited. However, it is necessary that the delegation to the relayer from the user includes data sufficient for the delegated relayer to execute the transaction (user tx) that the user desires to execute.

A special transaction (nested tx) having a nested structure may be adopted to the transaction delegation. The special transaction that is transmitted to the second device from the first device has a nested structure in the sense that the transaction (user tx) that the user desires to execute is included inside. The special transaction includes data required for determining the transaction (user tx) that the user desires to execute and the blockchain account to be an execution subject of the transaction (hereinafter, also referred to as an executer account). The special transaction may include a plurality of transactions (user tx). In this case, the special transaction includes the necessary data and the data of the blockchain account for each transaction (user tx).

The special transaction that is transmitted to the second device from the first device of the user may include a delegation condition (hereinafter, also referred to as cond) and a signature (hereinafter, also referred to as sig).

The second device of the relayer creates the delegation transaction (hereinafter, also referred to as delegation tx) in the format of the special transaction including the transaction (user tx) that the user desires to execute in the nested structure, on the basis of the transaction delegation from the user. The delegation transaction may include the transaction (user tx) that the user desires to execute, the delegation condition (cond), and the signature (sig).

The second device of the relayer requests the delegation transaction to the blockchain system on the basis of the account to which a relay user has a privilege (relayer account). The delegation transaction is executed with respect to an account caller contract that is a smart contract belonging to the blockchain system. As described below, the second device of the relayer may directly request the execution of the delegation transaction not only to the account caller contract but also to an executor account contract of the blockchain account to be the execution subject of the transaction. In this case, the stake of the fee token or the utility token required for requesting the execution of the transaction to the blockchain system is executed based on an account of the relayer.

The account caller contract requests the execution of the transaction (user tx) to the executor account contract that is operated as the account of the user, on the basis of the delegation transaction (delegation tx). The executor account contract executes the requested transaction (user tx) and executes the payment of the delegation fee token to the relayer from the user.

Accordingly, the user who receives the service can enjoy the service without being aware of the operation of various tokens in the blockchain system on which the service is based.

FIG. 1 is a schematic view of a system 100 of the present disclosure. The system includes a first device 1 of the user outside a blockchain system 300, and a second device 2 managed by the relayer that can be accessed from the first device 1. The system 100 includes instances of an account caller contract 301 and an executor account contract 302, in the blockchain system 300. In the present disclosure, the "blockchain system" indicates a system that includes a plurality of computers capable of performing communication connection to each other and a network for connecting the plurality of computers, and creates a blockchain by distributed processing of the plurality of computers.

In the system 100 of the present disclosure, the first device 1 of the user stores a private key corresponding to the blockchain system 300, and may not store an account associated with the fee token or the utility token of the blockchain system 300. Here, since the first device 1 receives the service on which the blockchain is based, the result of processing in the blockchain system 300 can be acquired. For example, the first device 1 is capable of acquiring a processing result from the blockchain system 300 on the basis of Web. In addition, the first device 1 is capable of transmitting and receiving data with respect to the second device 2.

The second device 2 is managed by the relayer having an account for enabling the fee token and the utility token to be transferred in the blockchain system 300 (relayer account). The second device 2 is capable of transmitting and receiving data with respect to the first device 1 of the user, and the transaction can be executed in the blockchain system 300 on the basis of the account of the relayer (relayer account). That is, the second device 2 is capable of paying (staking) the fee token or the utility token.

In the blockchain system 300 in the system 100 of the present disclosure, a blockchain technology capable of deploying (setting to an executable state) the smart contract with respect to the account is used. In the following example, it will be described that a blockchain technology of Ethereum is used in the blockchain system 300, but the present disclosure is not limited thereto. The blockchain system 300 may be based on EOS.

In the blockchain system 300, the instances of the account caller contract 301 and the executor account contract 302 is generated. As described below (Examples 4 and 6), the instances may be the same instance. The blockchain system 300 includes instances of a plurality of various contracts 303 corresponding to a plurality of applications. In addition, in the blockchain system, a delegation fee token management contract 304 managing the delegation fee token is generated.

In order to request processing to a target contract 303 that the user desires to execute the processing in smart contracts 303 corresponding to various applications in the blockchain system 300, transaction execution processing by an account having a management privilege for paying the fee token or the utility token is required. However, in the transaction of various tokens including the fee token or the utility token in the blockchain system 300, it is necessary for the user to have knowledge for the blockchain technology, and the like.

In the system 100 of the present disclosure, the device (the first device) 1 of the user who actually receives the service delegates the transaction (user tx) that the user desires to execute to the device (the second device) 2 of the relayer capable of possessing and transferring the fee token or the utility token of the blockchain system 300 attaining the service. The delegation allows the user to enjoy the execution result of the transaction in the blockchain system 300 even if the user is not capable of managing the token.

FIG. 2 is a schematic view of a procedure of transaction delegation processing in the system 100 of the present disclosure.

(1) The user (the first device 1) who desires the processing in the service determines or creates data for specifying the blockchain account (executor account) to be the execution subject of the transaction (user tx) desired to be executed in the blockchain.

In the state of (1), the user (the first device 1) determines or creates data for configuring the transaction (user tx) to be executed by the executor account contract in the blockchain system 300.

If the service, for example, is a game, it is considered that the user desires to execute the transaction of the generation or the transferal of items in the game to be attained by a distributed application of the blockchain system 300 (it is obvious that the service is not limited to the game). In this case, the blockchain account (executer account) for executing the transaction (user tx) that the user desires to execute, for example, is the account of the user in the blockchain system. In addition, if the desired transaction (user tx) is the generation or the transferal of the items, the data for configuring the transaction (user tx) may include data for specifying the items, data for specifying a transferee, and the like.

In the stage of (1), the user (the first device 1) acquires data (sig) required for validation by a method of validating (for example, an electronic signature) that the blockchain account (executer account) of the user and the transaction (user tx) desired to be executed are designated by the user oneself.

(2) The first device 1 of the user transmits the blockchain account (executer account) of the user, the transaction (user tx) desired to be executed, and the data required for the validation to the second device 2 of the relayer outside the blockchain system 300. Accordingly, the blockchain account (executer account) and the desired transaction (user tx) are transmitted to the relayer.

(3) The second device 2 of the relayer creates the delegation transaction (delegation tx) in which the blockchain account (executer account) corresponding to the user and the desired transaction (user tx) are embedded, on the basis of the data received from the first device 1 of the user. The second device 2 of the relayer broadcasts the delegation transaction to the blockchain system 300 by the privilege of the account of the relayer or another account (an arbitrary account) that can be used by the relayer.

(4) By the transmission of the broadcast, the execution of the transaction (user tx) that the user desires to execute using the blockchain account (executer account) corresponding to the user in the blockchain system 300 is attained. The fee token or the utility token required for the execution of the transaction (user tx) is paid from an account (an account of the relayer or another account) designated when the relayer broadcasts the delegation transaction.

As described above, the device (the first device) 1 used by the user who actually receives the service delegates the transaction (user tx) that the user desires to execute to the device (the second device) 2 of the relayer who possesses the fee token or the utility token in the blockchain system 300. By the delegation, the user is capable of executing the transaction in the blockchain system 300 without having a privilege for managing the fee token or the utility token.

Accordingly, the user who receives the service is capable of executing the transaction without being aware of the operation of the fee token or the utility token of the blockchain system 300 on which the service is based.

A specific configuration of the system for attaining such processing will be described.

Figure 3:
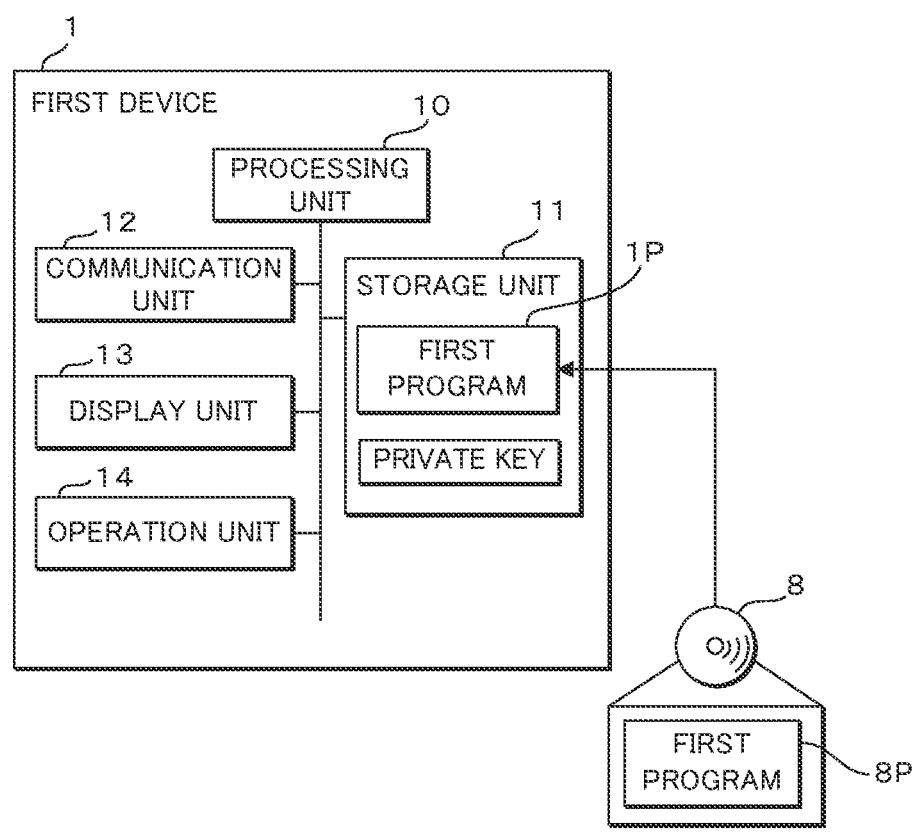
FIG. 3 is a block diagram illustrating a configuration of a first device 1.

FIG. 3 is a block diagram illustrating the configuration of the first device 1. The first device 1, for example, is a smart phone or a tablet terminal. The first device 1 includes a processing unit 10, a storage unit 11, a communication unit 12, a display unit 13, and an operation unit 14.

As the processing unit 10, a processor such as a central processing unit (CPU) and a graphics processing unit (GPU), a memory, or the like is used. Note that, the processing unit 10 may be configured as one hardware (system on a chip: SoC) in which the processor, the memory, the storage unit 11, and the communication unit 12 are integrated.

As the storage unit 11, a flash memory is used, and a program and data referred to by the processing unit 10, such as a first program 1P, are stored in the storage unit 11. The first program 1P is a program for causing a computer to function as the first device 1 of the system 100 of the present disclosure. In the storage unit 11, as illustrated in FIG. 3, the private key of the user in the blockchain system 300 may be stored. The private key may be stored not to be rewritable in the memory of the processing unit or the storage unit 11 (the chipping of a wallet).

As the first program 1P that is stored in the storage unit 11, a first program 8P stored in a storage medium 8 that is readable from the computer may be read out by the processing unit 10 and stored in the storage unit 11.

The communication unit 12 is a communication module attaining communication connection to the second device 2 and other communication devices. As the communication unit 12, a network card, a wireless communication device, or a carrier communication module is used.

As the display unit 13, a display device such as a liquid crystal panel or an organic EL display is used. The operation unit 14 is an interface accepting the operation of the user, and a physical button, a touch panel device with a built-in display, a speaker, a microphone, and the like are used as the operation unit 14. The operation unit 14 may accept the operation on a screen that is displayed by the display unit 13 in the physical button or the touch panel, or may accept the operation in an interactive format with a voice output from the speaker by recognizing operation content from an input voice of the microphone.

Figure 4:
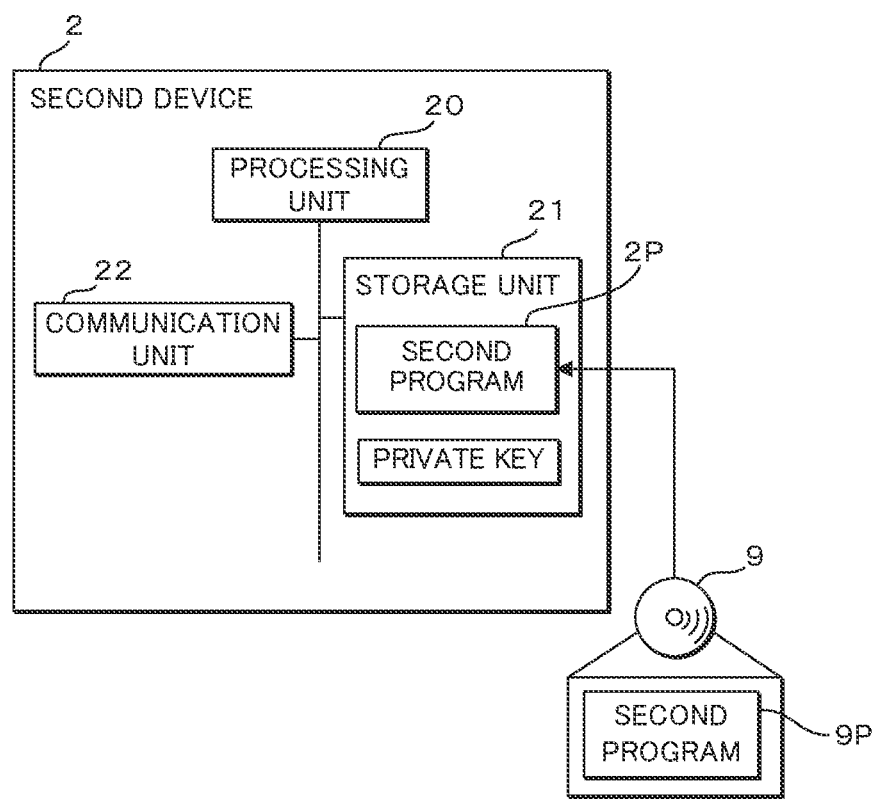
FIG. 4 is a block diagram illustrating a configuration of a second device 2 of a relayer.

FIG. 4 is a block diagram illustrating the configuration of the second device 2 of the relayer. As with the first device 1, the second device 2 is a communication terminal device such as a smart phone or a tablet terminal. The second device 2 may be a second computer, or may be a desktop type or laptop type personal computer. The second device 2 includes a processing unit 20, a storage unit 21, and a communication unit 22.

As the processing unit 20, a processor such as CPU and GPU, a memory, or the like is used. The processing unit 20 acquires the data transmitted from the first device 1, and attains the creation of the delegation transaction and the execution of the transaction, on the basis of a second program 2P that is stored in the storage unit 21. As the storage unit 21, a hard disk or a flash memory is used, and a program and data referred to by the processing unit 20, such as the second program 2P, are stored in the storage unit 21.

As the second program 2P that is stored in the storage unit 21, a second program 9P stored in a storage medium 9 that is readable from the computer may be read out by the processing unit and stored in the storage unit 11.

The communication unit 22 is a communication module attaining communication connection to the first device 1 or the blockchain system 300. As the communication unit 22, a network card, a wireless communication device, or a carrier communication module is used.

Figure 5:
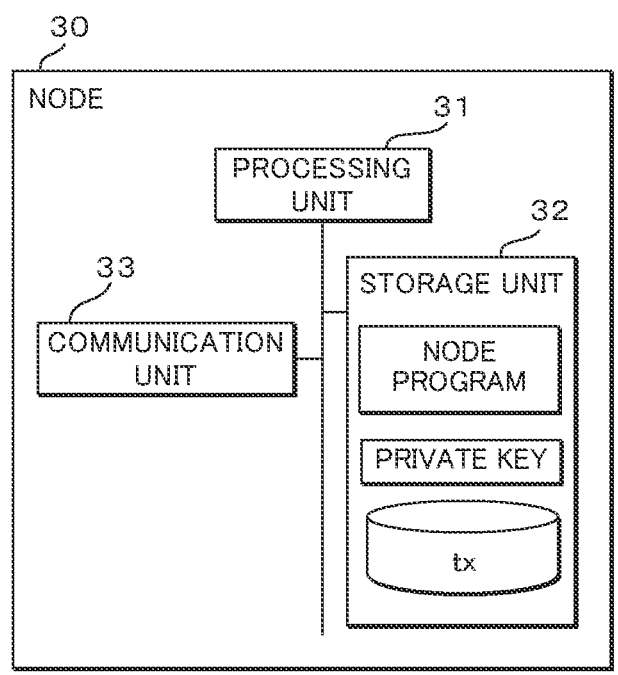
FIG. 5 is a block diagram illustrating a configuration of a node in a blockchain system.

FIG. 5 is a block diagram illustrating the configuration of a node 30 in the blockchain system 300. The node 30 may be a server computer, may be a desktop type or laptop type personal computer, or may be a communication terminal device such as a smart phone. The node 30 includes a processing unit 31, a storage unit 32, and a communication unit 33. In addition, if the node 30 is a device including at least the processing unit 31 and the communication unit 33, a part of the node or the entire node can be configured by a part of the processing unit 31.

As the processing unit 31, a processor such as CPU and GPU, a memory, or the like is used. The processing unit 31 may be configured as one hardware in which the processor, the memory, the storage unit 32, and the communication unit 33 are integrated. In the memory of the processing unit 31, the private key that is possessed by each of the nodes 30 may be stored. Then, the processing unit 31 executes each processing based on a node program that is stored in the storage unit 32, and causes a general-purpose computer to function as the node in the blockchain system 300.

As the storage unit 32, a hard disk or a flash memory is used, and a program and data referred to by the processing unit 31, such as the node program, are stored in the storage unit 32. The storage unit 32 stores the blockchain. The node program includes a program for allowing the computer to function as the smart contract described below (the processing unit 31 executing predetermined calculation processing with respect to the execution of the transaction). The private key described above may be stored in the storage unit 32. The storage unit 32 may store a public key and an address based on the private key.

The communication unit 33 is a communication module attaining intercommunication of the node 30. As the communication unit 33, a network card, an optical communication device, a wireless communication device, or the like is used.

Figure 6:
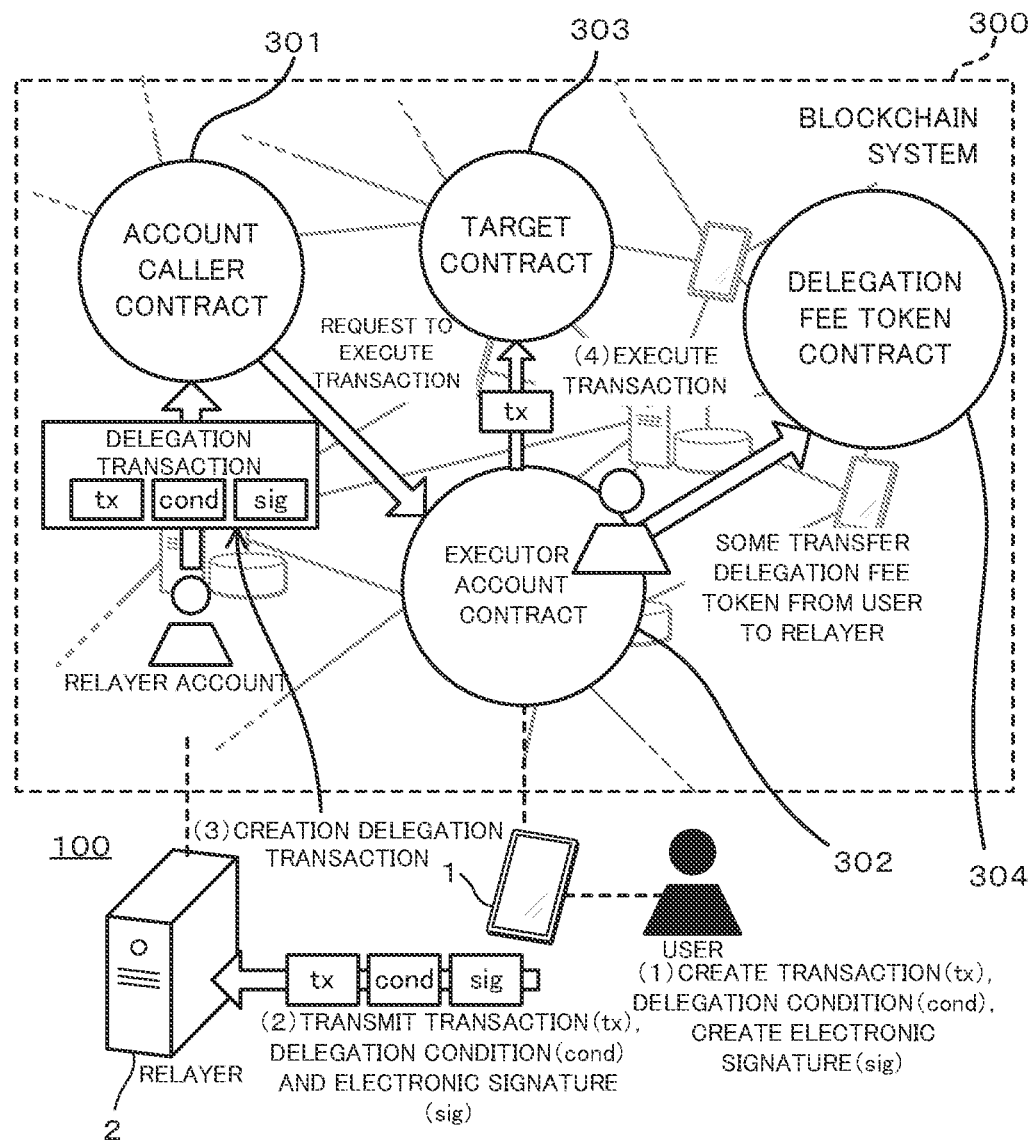
FIG. 6 is a schematic view of processing in the system.

FIG. 6 is a schematic view of the processing in the system 100. In order for the delegation of the transaction, the first device 1 of the user creates data for the relayer including the data required for creating the transaction (user tx) that the user desires to execute and the blockchain account (executer account) to be the execution subject of the transaction (corresponding to (1) in FIG. 2). In the example illustrated in FIG. 6, the data including the transaction (user tx) of the user, the blockchain account (executer account) corresponding to the user, the transaction condition (cond) and the validation method (sig) is created and transmitted to the second device 2 of the relayer (corresponding to (2) in FIG. 2).

The second device 2 of the relayer creates the delegation transaction (delegation tx) on the basis of the content of the data transmitted from the first device 1 (corresponding to (3) in FIG. 2). The delegation transaction is the special transaction (nested tx) including the transaction (user tx) that the user desires to execute, the delegation condition (cond), and the signature (sig) in the nested structure.

The second device 2 possesses the fee token or the utility token that is capable of executing the transaction with respect to the blockchain system 300. The second device 2 executes the delegation transaction on the basis of the account (relayer account) to which the relayer has the privilege (corresponding to (3) in FIG. 2). The delegation transaction is executed with respect to the account caller contract 301 in the blockchain.

The account caller contract 301 requests the execution of the transaction (user tx) to the executor account contract 302 that is operated as the account of the user, on the basis of the delegation transaction (delegation tx). The executor account contract 302 executes the requested transaction (user tx) by the target contract 303. The executor account contract 302 executes the requested transaction (user tx), and executes a transaction including the payment (transfer) of the delegation fee to the relayer with respect to the delegation fee token management contract 304. The delegation fee is different from the fee token or the utility token.

Figure 7:
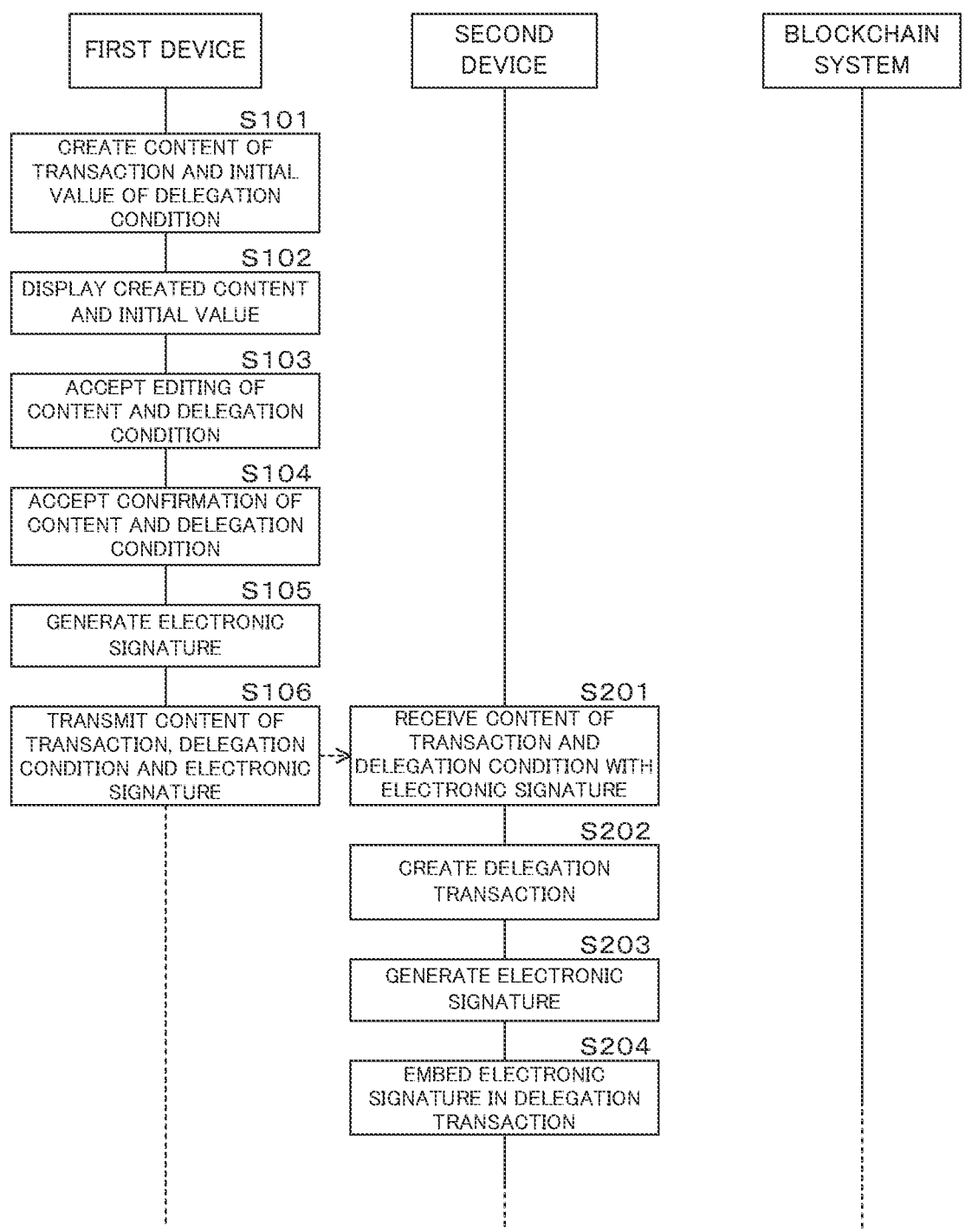
FIG. 7 is a sequence diagram illustrating an example of a procedure of delegation transaction creation processing.

FIG. 7 is a sequence diagram illustrating an example of a procedure of delegation transaction creation processing. The procedure of the processing illustrated in the sequence diagram of FIG. 7 corresponds to the details of the procedure of the processing to (2) in FIG. 2 or FIG. 6.

The processing unit 10 of the first device 1 creates the content of the transaction (user tx) that the user desires to execute and the initial value of the delegation condition (cond), on the basis of the first program 1P that is stored in the storage unit 11 (step S101). The content of the transaction (user tx) includes an address of the target contract 303 of the transaction, an identifier of a target function in the target contract 303, and argument data of the target function. The delegation condition of the transaction includes an address corresponding to the private key of the user and data required for determining an address of the executor account contract 302. The delegation condition further includes an address of the delegation fee token management contract 304, an address of a payee of the delegation fee (token) and data required for determining the fee.

The processing unit 10 displays the created content of the transaction (user tx) and the created initial value of the delegation condition (cond) on the display unit 13 (step S102). The content of the transaction that is displayed in step S102 may be the output of the address, the identifier, and the argument data in text, or may be the output with a contract name, an identification icon, or the like. The delegation condition to be displayed may be the output in text, or may be the output with an icon.

The processing unit 10 accepts the editing of the content of the transaction (user tx) and the delegation condition (cond) by the user (step S103). If there is no change, the processing of step S103 is skipped.

The processing unit 10 accepts the confirmation of the content of the transaction (user tx) desired to be executed and the delegation condition (cond) (step S104).

The processing unit 10 generates an electronic signature based on the private key of the user with respect to the data of the confirmed content of the transaction (user tx) and the confirmed delegation condition (cond) (step S105). The private key may be safely stored in the storage unit 11 of the first device 1, or may be the input accepted from the user may be accepted.

The processing unit 10 transmits the confirmed content of the transaction (user tx), the confirmed delegation condition (cond), and the electronic signature acquired in step S105 to the second device 2 of the relayer (step S106). The content of the transaction (user tx) includes the address of the target contract 303 of the transaction, the identifier of the target function, and the argument data of the target function.

The processing unit 20 of the second device 2 receives the content of the transaction (user tx) and the delegation condition (cond) with the electronic signature (step S201). In the step S201, the processing unit 20 determines whether or not the delegation is acceptable, on the basis of the transmitted content, and if the delegation is not acceptable, the processing unit 20 may respond to the first device 1 of the user.

The processing unit 20 creates the delegation transaction (delegation tx) in which the received content of the transaction (user tx), the received delegation condition (cond), and the received electronic signature are embedded (step S202). The delegation transaction (delegation tx) that is created in step S202 is the special transaction (nested tx) having a nested structure.

The processing unit 20 generates an electronic signature by the private key of the blockchain account (relayer account) in the blockchain system 300 associated with the relayer managing the second device 2 with respect to the delegation transaction created in step S202 (step S203).

The processing unit 20 embeds the electronic signature generated in step S203 in the delegation transaction (delegation tx) created in in the step S202 (step S204), and the delegation transaction (delegation tx) creation processing is completed.

The delegation transaction that is created in step S202 includes an address of the account caller contract that is a target of the delegation transaction and an identifier of a call function. The delegation transaction includes the content of the transaction (user tx) that the user desires to execute as an argument of the call function. The content of the transaction is the address of the target contract, the identifier of the target function in the contract, and data to be input to the function (target function). The delegation condition includes the address corresponding to the private key of the user and data required for determining the address of the execution account contract. The data required for determining the address of the execution account contract is the address itself or an arbitrary value or a character string (so-called salt) in a case of using a virtual account contract. The delegation condition further includes a condition relevant to the delegation fee. The delegation fee is different from the fee token or the utility token. The condition relevant to the delegation fee includes the address of the delegation fee token management contract 304 managing a token paid as the delegation fee. The condition relevant to the delegation fee includes the payee of the delegation fee, that is, an address for the relayer to receive, and the data required for determining the delegation fee. The data required for determining the delegation fee, for example, is a rate between the token paid as the delegation fee (delegation fee token) and the fee token, and a rate between the delegation fee token and the utility token.

Even if the condition relevant to the delegation fee to be included in the delegation transaction (delegation tx) is not designated or even if it is determined that a condition corresponding to non-designation is set, the fee token or the utility token required for executing the transaction (user tx) that the user desires to execute is paid on the basis of the account of the relayer. The user may not pay the delegation fee. In addition, a token in the same blockchain system 300 as that of the target contract 303 of the transaction that the user desires to execute, that is, a distributable token can be designated as the token paid as the delegation fee (delegation fee token).

Figure 8:
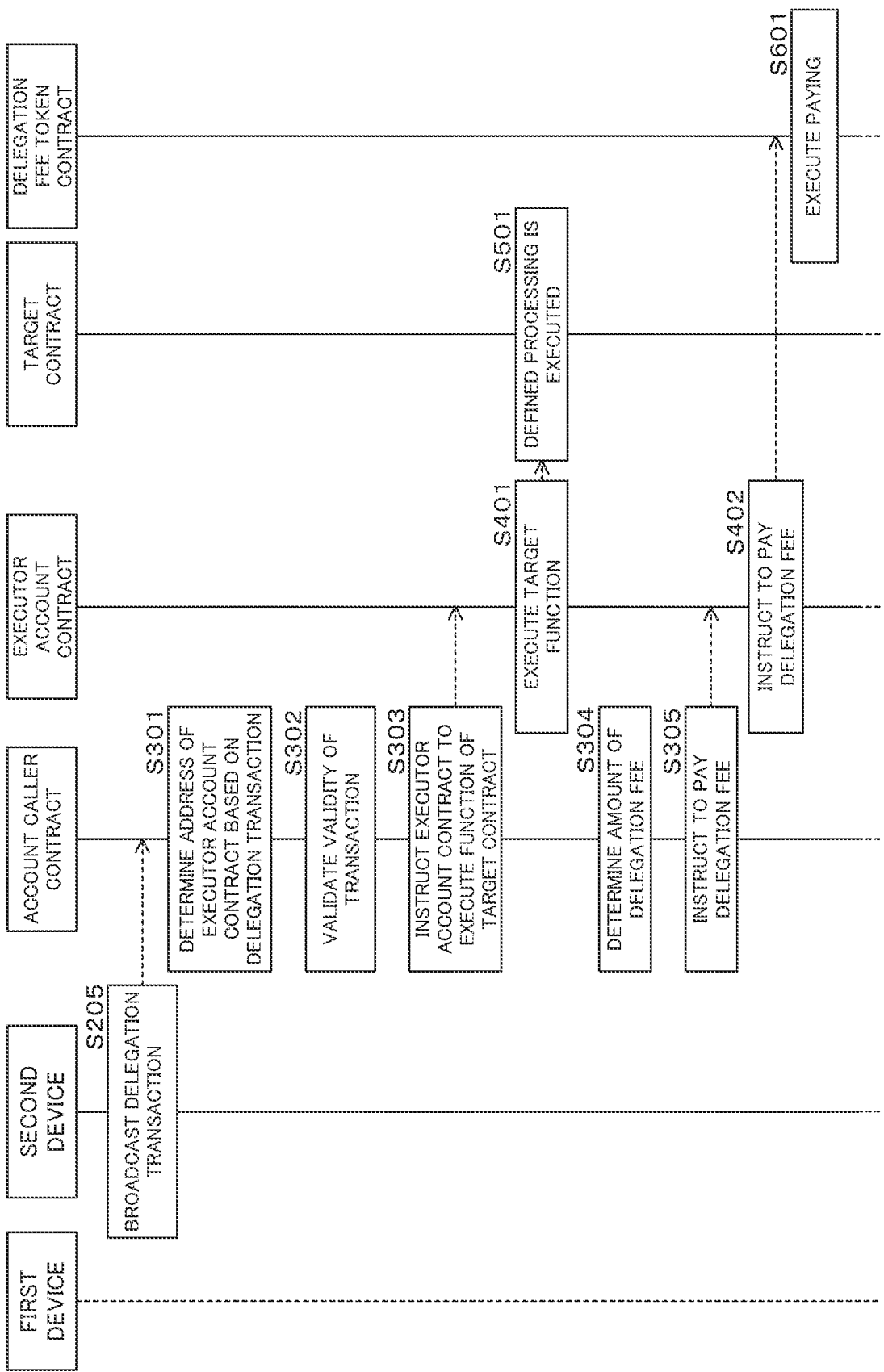
FIG. 8 is a sequence diagram illustrating an example of a procedure of transaction delegation execution processing.

FIG. 8 is a sequence diagram illustrating an example of a procedure of transaction delegation execution processing. The procedure of the processing illustrated in the sequence diagram of FIG. 8 corresponds to the procedure of the processing from (3) to (4) in FIG. 2 or FIG. 6.

The second device 2 of the relayer broadcasts the created delegation transaction (delegation tx) (step S205).

If the delegation transaction created in step S205 is broadcasted, the delegation transaction is imported into the blockchain by the node 30 of the blockchain system 300. The call function of the account caller contract 301 of the address that is included in the delegation transaction is executed on the basis of the delegation transaction imported into the blockchain, and the following processing proceeds. The following processing is executed as atomically indivisible processing unless the validation of the validity of the signature fails (S302).

The instance of the account caller contract 301 (hereinafter, simply referred to as the account caller contract) determines an address on the basis of the data required for determining the address of the executor account contract 302 that is included in the delegation transaction by executing the call function (step S301).

The account caller contract 301 validates the validity of the electronic signature with respect to the content of the transaction (user tx) that the user desires to execute and the delegation condition, which are included in the delegation transaction (step S302).

If it succeeds in the validation of step S302 that the signature is valid, the account caller contract 301 executes the next processing. If it is determined that the signature is not valid in the validation of step S302, the account caller contract 301 directly ends the processing.

The account caller contract 301 instructs the executor account contract 302 of the address determined in step S301 to execute the target function of the target contract 303 on the basis of the transaction (user tx) that the user desires to execute (step S303). In step S303, the account caller contract 301 transmits the address of the target contract 303 of the transaction (user tx) that the user desires to execute, the identifier of the target function, and the data to be input to the target function to the executor account contract 302.

The executor account contract 302 executes the target function of the target contract 303 by inputting the transmitted data to the target function as the argument, on the basis of the transmitted address and the transmitted identifier (step S401).

Accordingly, the processing defined by the execution of the target function in the target contract 303 of the transaction that the user desires to execute is executed (step S501). By executing the defined processing, a result of the transaction (asset transfer, data storage, or computing) that the user desires to execute is obtained.

The account caller contract 301 determines the amount of delegation fee (delegation fee token) to be paid by the user, on the basis of the data required for determining the delegation fee in the delegation condition included in the delegation transaction (step S304).

The account caller contract 301 instructs the executor account contract 302 to pay the determined amount of delegation fee (step S305). In step S305, the account caller contract 301 performs the designation of the address of the delegation fee token management contract 304 and an address of the payee of the delegation fee, together with the instruction.

The executor account contract 302 instructs the designated delegation fee token management contract 304 to pay the delegation fee to the designated address of the payee (step S402).

By the instruction in step S402, the delegation fee token management contract 304 executes processing of paying the delegation fee to the designated address of the payee (step S601). The amount of delegation fee may be zero. Accordingly, delegation transaction execution processing is ended.

By the processing illustrated in the sequence diagram of FIG. 7 and FIG. 8, the user can enjoy the execution result of the processing of the target contract 303 in the blockchain system 300 without possessing the account to which the user has the privilege for transferring the fee token or the utility token in the blockchain system 300.

The processing illustrated in the sequence diagram of FIG. 8 is atomically connected processing in which when a function of a certain contract 302 is called, another function is called by the call of the function, and is executed as a set of processings without performing the determination in each of the contracts 301, 302, 303, and 304 except for the validation of the signature. The delegation transaction (delegation tx) is attained in the form of the special transaction (nested tx) including the transaction (user tx) desired by the user in the nested structure.

In the above description, it has been described that the account caller contract 301 and the executor account contract 302 are separate instances. However, such contracts 301 and 302 may be the same contract. In addition, there are two methods to collect the delegation fee from user: a method of collecting the delegation fee with the delegation fee token and a method of not collecting the delegation fee. Hereinafter, a plurality of Examples will be described on the basis of such variations.

If there are the account caller contract 301 and the executor account contract 302 as the separate instances, a variation of whether or not the executor account contract 302 is a virtual account contract is considered. The virtual account contract is a special contract that has no substance until the processing of the transaction (user tx) that the user actually desires to execute and the call function are executed.

The first merit of using the virtual account contract is that the virtual account contract is capable of holding a token even if there is no substance. That is, no fee is charged to the user before activation. Since it is necessary that there is previously a contract holding a token, the general contract in the blockchain system 300 requires a deployment fee. In addition, a cost relevant to the activation is also low. Since the instance of the virtual account contract is extremely light, that is, a data amount of a program is small, the deployment fee is small. By executing the deployment in a set of processings of the transaction delegation (tx delegation), the relayer is capable of assuming the deployment fee.

The second merit of using the virtual account contract is that the maintainability of an asset is high. Since the virtual account contract before the activation has no substance, the virtual account contract is least likely to be attacked. Even if it is necessary that a public key of a holder of the virtual account contract is stored in the blockchain, the public key can be hidden by being hashed, and thus, it is substantially impossible to attack the holder. Such properties are the same even if the virtual account contract is used alone.

There are three ways of whether or not the account caller contract 301 and the executor account contract 302 are the same, and whether or not the virtual account contract is used in a case where the account caller contract 301 and the executor account contract 302 are separate from each other. There are also two ways of a method of collecting the delegation fee and a method for the relayer to assume the delegation fee without collecting the delegation fee. Therefore, hereinafter, the execution of the transaction delegation will be described by six (3×2) Examples. Since hardware configurations and basic processings of the blockchain system 300, the first device 1 of the user, and the second device 2 of the relayer are the same, the detailed procedure of the processing will be described by applying reference numerals common to the configurations described above.

Example 1

In Example 1, the account caller contract 301 and the executor account contract 302 are separate instances, the executor account contract 302 is a virtual account contract, and the delegation fee (delegation fee token) is collected with an arbitrary token. Wherein the arbitrary token is a token that is possessed by the user in the blockchain account of the blockchain system 300, and is not the fee token or the utility token.

Figure 9:
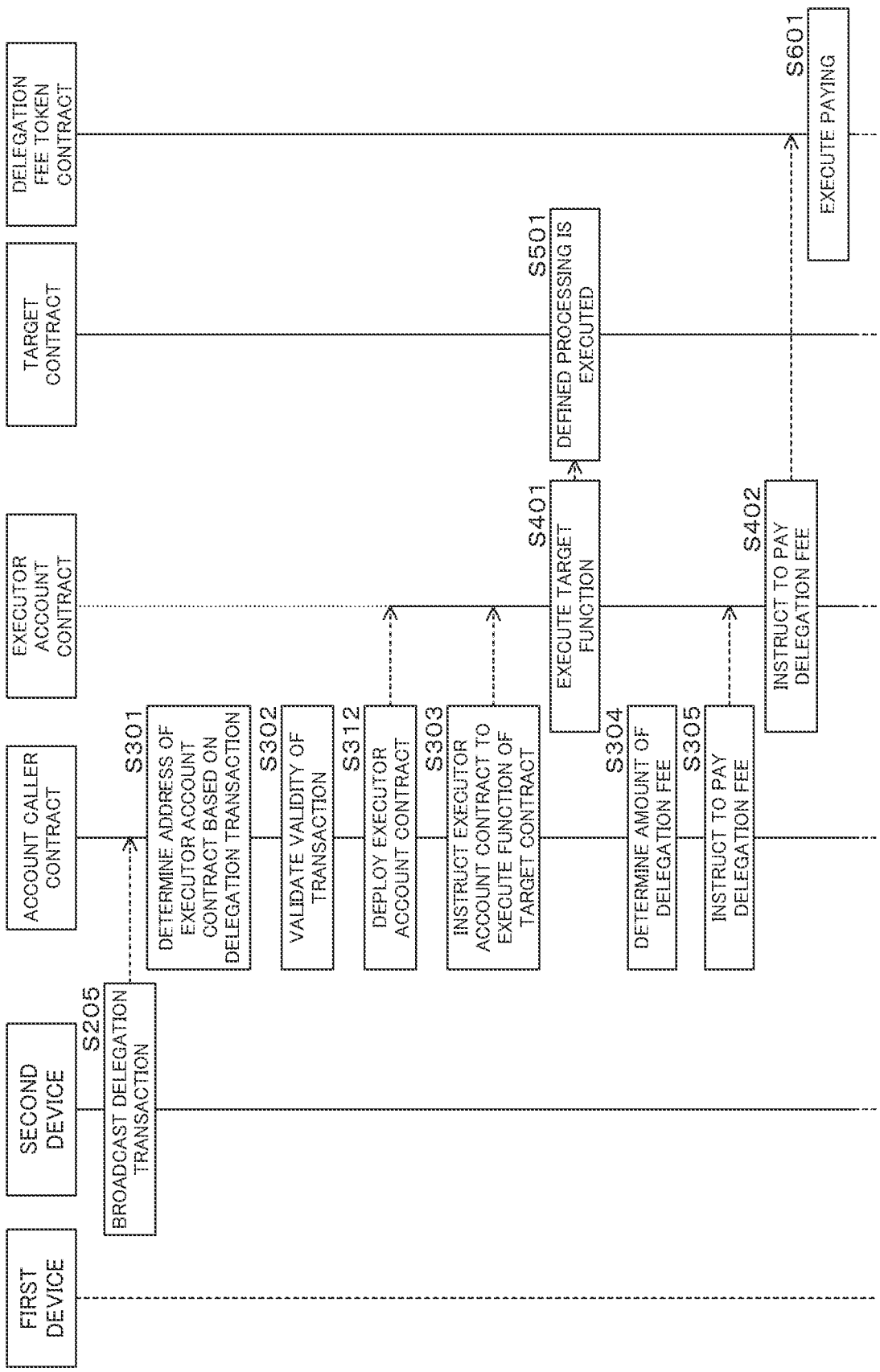
FIG. 9 is a sequence diagram illustrating an example of transaction delegation processing in Example 1.

In Example 1, the delegation transaction creation processing illustrated in the sequence diagram of FIG. 7 is executed, and the following transaction delegation processing is executed, between the first device 1 of the user and the second device 2 of the relayer. FIG. 9 is a sequence diagram illustrating an example of the transaction delegation processing in Example 1. In the procedure of the processing procedure illustrated in sequence diagram of FIG. 9, the same step numbers will be applied to the procedure of the processing illustrated in sequence diagram of FIG. 8, and the detailed description will be omitted.

The account caller contract 301 validates the validity of the electronic signature of the transaction (user tx) that the user desires to execute on the basis of the imported delegation transaction (S302), and if it succeeds in the validation, the executor account contract 302 of the address determined in step S302 is deployed (step S312).

The account caller contract 301 instructs the deployed executor account contract 302 to execute the target function of the target contract 303 (S303). The processing subsequent to step S304 is the same as the processing referring to the sequence diagram of FIG. 8.

Note that, the processing illustrated in sequence diagram of FIG. 9 is executed only for the first time when the executor account contract 302 is called, and the processing illustrated in the sequence diagram of FIG. 8 is executed after the second time.

As described above, since the virtual account contract is used, it is not necessary to pay the deployment fee until the executor account contract 302 is initially called (activated) and deployed.

Example 2

In Example 2, the account caller contract 301 and the executor account contract 302 are separate instances, the executor account contract 302 is not a virtual account contract, and the delegation fee is collected with an arbitrary token.

The content of the processing of each of the contracts in Example 2 is the same as the procedure of the processing illustrated in the sequence diagram of FIGS. 7 and 8, and thus, the illustration will be omitted.

In Example 2, the delegation fee is paid to the delegation fee token management contract 304 by the of the executor account contract 302 in step S402, and thus, the payment processing of the delegation fee, which is not zero, to the relayer is executed.

Example 3

In Example 3, the account caller contract 301 and the executor account contract 302 are the same instance, which is not a virtual account contract, and the delegation fee is collected with an arbitrary token.

In Example 3, the account caller contract 301 and the executor account contract 302 are the same instance. The delegation transaction creation processing illustrated in sequence diagram of FIG. 7 is executed between the first device 1 of the user and the second device 2 of the relayer, but in this case, the data required for determining the address of the executor account contract 302 in the delegation condition is not required.

Figure 10:
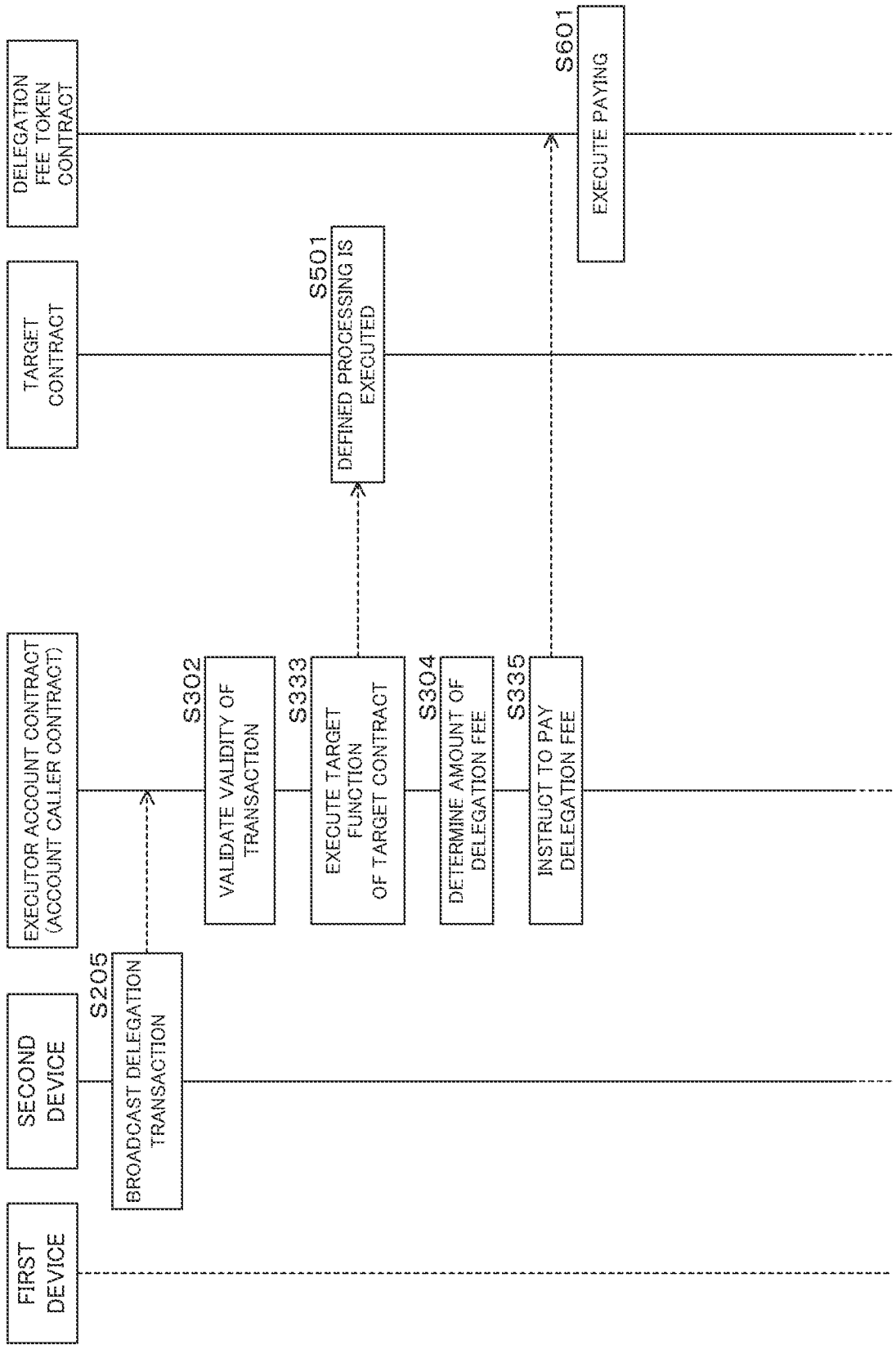
FIG. 10 is a sequence diagram illustrating an example of transaction delegation processing in Example 3.

FIG. 10 is a sequence diagram illustrating an example of the transaction delegation processing in Example 3. In the procedure of the processing illustrated in the sequence diagram of FIG. 10, the same step numbers will be applied to the processing common to the procedure of the processing illustrated in the sequence diagram of FIG. 8, and the detailed description will be omitted.

In Example 3, the account caller contract 301 and the executor account contract 302 are the same. Therefore, the processing of step S301 for determining the address of the executor account contract 302 with respect to the broadcasted delegation transaction (delegation tx) will be omitted.

In Example 3, the executor account contract 302 (the account caller contract 301) executes the validation of the validity of the electronic signature with respect to the content of the transaction (user tx) that the user desires to execute and the delegation condition, by executing the call function, on the basis of the address that is included in the delegation transaction (S302).

If it succeeds in the validation of step S302 that the signature is valid, the executor account contract 302 executes the following processing. The executor account contract 302 executes the target function of the target contract 303 by inputting the input data to the target function as an argument, on the basis of the address of the target contract 303 and the identifier of the target function, which are included in the transaction that the user desires to execute (step S333).

Accordingly, in the target contract 303 of the transaction that the user desires to execute, the processing defined by executing the target function is executed (S501). By executing the defined processing, the result of the transaction that the user desires to execute (the asset transfer, the data storage, or the computing) is obtained.

The executor account contract 302 determines the amount of delegation fee token to be paid by the user (S304). The executor account contract 302 instructs the delegation fee token management contract 304 to pay the amount of delegation fee determined in step S304 to the address of the payee, on the basis of the address that is included in the delegation transaction (step S335). The executor account contract 302 ends the delegation transaction execution processing.

By the instruction in step S335, the delegation fee token management contract 304 executes the payment processing of the delegation fee with respect to the designated address of the payee (the relayer).

Example 4

In Example 4, the account caller contract 301 and the executor account contract 302 are separate instances, the executor account contract 302 is a virtual account contract, and the delegation fee is not collected. In this case, the user may not even possess the account in the blockchain system 300.

In Example 4, the delegation transaction creation processing illustrated in the sequence diagram of FIG. 7 is executed between the first device 1 of the user and the second device 2 of the relayer, but the delegation fee is not collected. Therefore, in the delegation transaction (delegation tx) to be created, an address of a delegation fee management contract (a delegation fee token contract), the address of the payee of the delegation fee, and the data required for determining the delegation fee are not required in the delegation condition.

Figure 11:
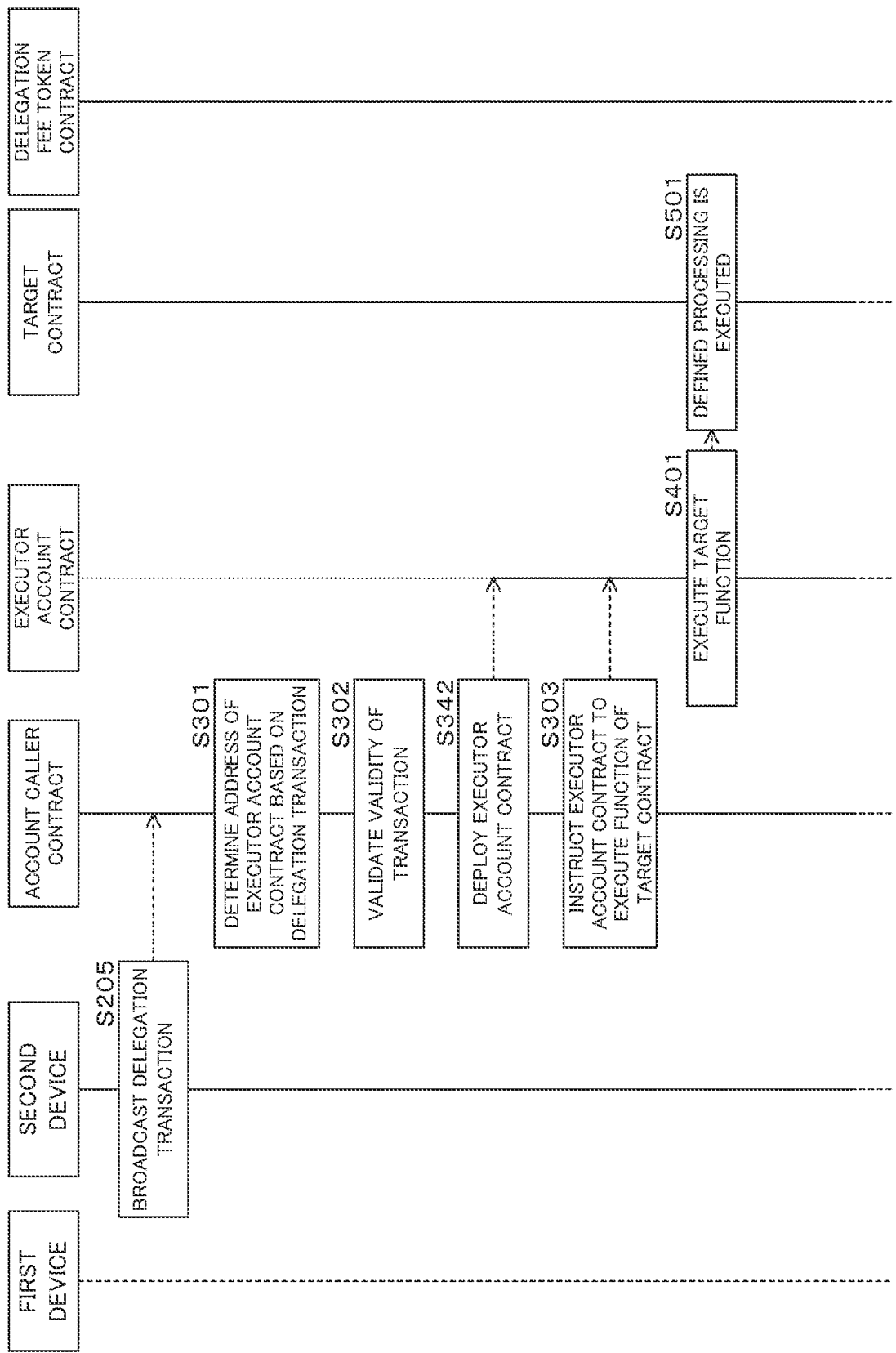
FIG. 11 is a sequence diagram illustrating an example of transaction delegation processing in Example 4.

FIG. 11 is a sequence diagram illustrating an example of the transaction delegation processing in Example 4. In the procedure of the processing illustrated in the sequence diagram of FIG. 11, the same step numbers will be applied to the procedure common to the procedure of the processing illustrated in the sequence diagram of FIG. 8, and the detailed description will be omitted.

The account caller contract 301 validates the validity of the electronic signature of the transaction that the user desires to execute, on the basis of the imported delegation transaction (S302), and if it succeeds in the validation, the executor account contract 302 of the address determined in step S302 is deployed (step S342).

The account caller contract 301 instructs the deployed executor account contract 302 to execute the target function of the target contract 303 (S303).

The executor account contract 302 executes the target function of the target contract by inputting the transmitted data to the target function as an argument, on the basis of the transmitted address and the transmitted identifier (S401), and the processing is ended. The processing subsequent to step S304 in the procedure of the processing illustrated in sequence diagram of FIG. 8 is not executed.

By the processing of step S401, in the target contract 303 of the transaction that the user desires to execute, the processing defined by executing the target function is executed (S501). By executing the defined processing, the result of the transaction (the asset transfer, the data storage, or the computing) that the user desires to execute is obtained.

Example 5

In Example 5, the account caller contract 301 and the executor account contract 302 are separate instances, the executor account contract 302 is not a virtual account contract, and the delegation fee is not collected.

In Example 5, the delegation transaction creation processing illustrated in the sequence diagram of FIG. 7 is executed between the first device 1 of the user and the second device 2 of the relayer, but the delegation fee is not collected. Therefore, in the delegation transaction (delegation tx) to be created, the address of the delegation fee token management contract 304, the address of the payee of the delegation fee, and the data required for determining the delegation fee are not required in the delegation condition.

Figure 12:
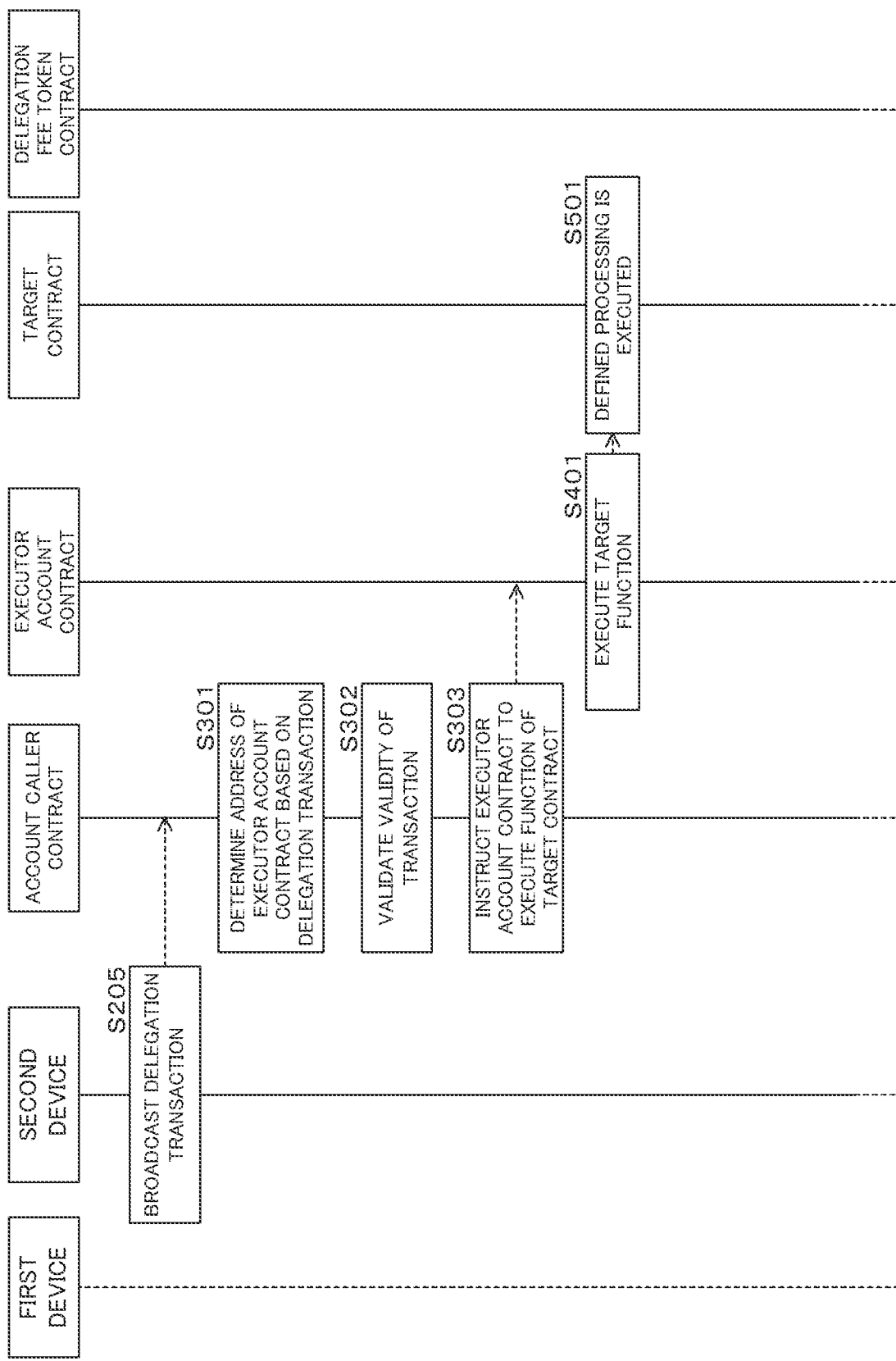
FIG. 12 is a sequence diagram illustrating an example of transaction delegation processing in Example 5.

FIG. 12 is a sequence diagram illustrating an example of the transaction delegation processing in Example 5. In the procedure of the processing illustrated in sequence diagram of FIG. 12, the same step numbers will be applied to the procedure common to the procedure of the processing illustrated in the sequence diagram of FIG. 8, and the detailed description will be omitted.

The account caller contract 301 determines the address of the executor account contract 302 on the basis of the imported delegation transaction (S301). The account caller contract 301 validates the validity of the electronic signature of the transaction (user tx) (S302).

The account caller contract 301 instructs the executor account contract 302 of the address determined in step S301 to execute the target function of the target contract 303 (S303).

The executor account contract 302 that has received the instruction executes the target function of the target contract 303 by inputting the transmitted data to the target function as an argument, on the basis of the transmitted address and the transmitted identifier (S401), and the processing is ended. The processing subsequent to step S304 in the procedure of the processing illustrated in the sequence diagram of FIG. 8 is not executed.

Example 6

In Example 6, the account caller contract 301 and the executor account contract 302 are the same instance, which is not a virtual account contract, and the delegation fee is not collected.

In Example 6, the delegation transaction creation processing illustrated in the sequence diagram of FIG. 7 is executed between the first device 1 of the user and the second device 2 of the relayer, but the account caller contract 301 and the executor account contract 302 are the same contract, and the delegation fee is not collected. Therefore, in the delegation transaction (delegation tx) to be created, the data required for determining the address of the executor account contract 302 is not included in the delegation condition. In the delegation condition, the address of the delegation fee token management contract 304, the address of the payee (the relayer) of the delegation fee, and the data required for determining the delegation fee are not also required. In Example 6, the delegation condition is satisfied by including the address corresponding to the private key of the user.

Figure 13:
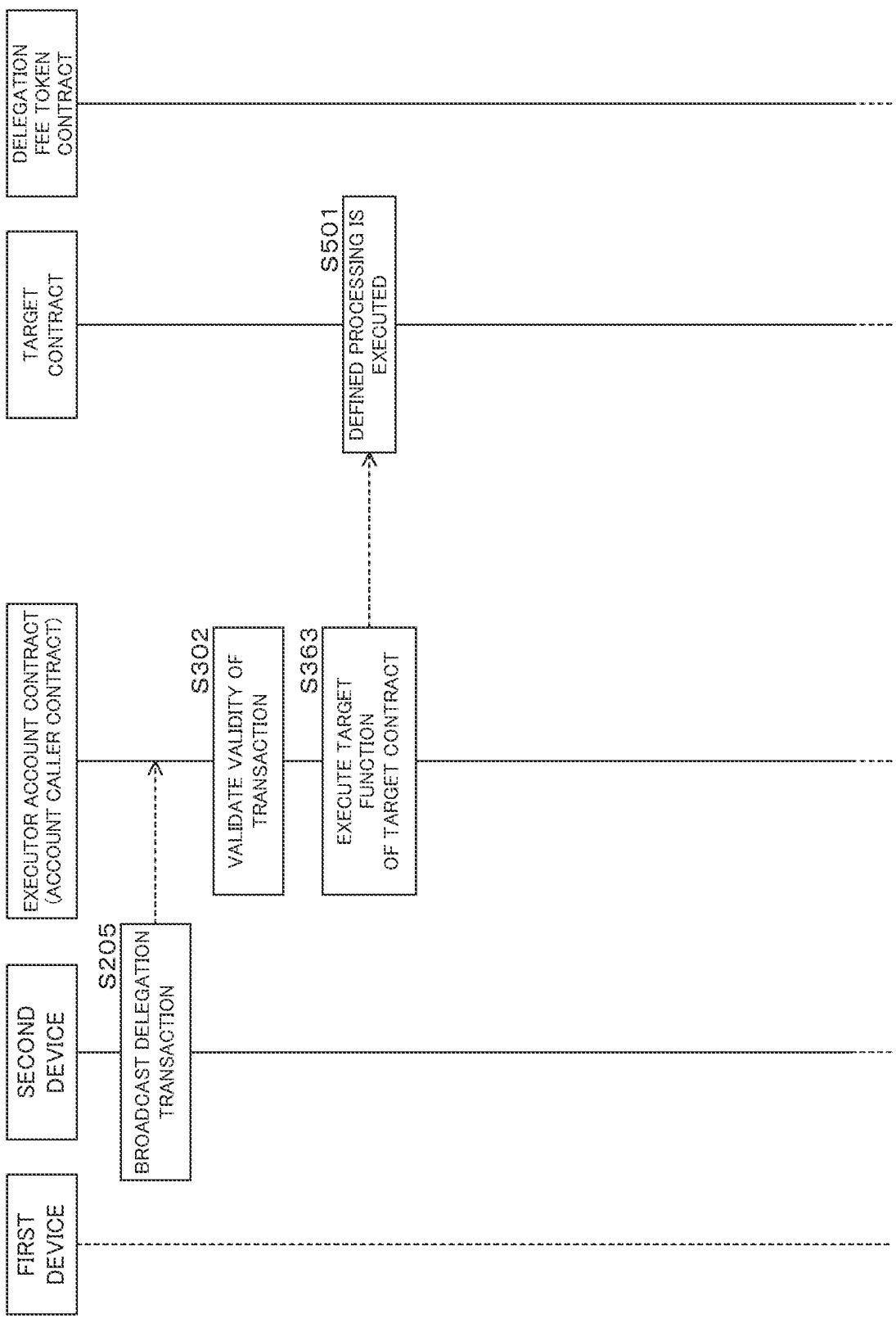
FIG. 13 is a sequence diagram illustrating an example of transaction delegation processing in Example 6.

FIG. 13 is a sequence diagram illustrating an example of the transaction delegation processing in Example 6. In the procedure of the processing illustrated in the sequence diagram of FIG. 13, the same step numbers will be applied to the processing common to the procedure of the processing illustrated in the sequence diagram of FIG. 8, and the detailed description will be omitted.

In Example 6, the account caller contract 301 and the executor account contract 302 are the same. Therefore, the processing of step S301 for determining the address of the executor account contract 302 with respect to the broadcasted delegation transaction (delegation tx) will be omitted.

In Example 6, the executor account contract 302 (the account caller contract 301) executes the content of the transaction (user tx) that the user desires to execute and the validation of the validity of the electronic signature with respect to the delegation condition by executing the call function, on the basis of the address that is included in the delegation transaction (S302).

If it succeeds in the validation of step S302 that the signature is valid, the executor account contract 302 that is also the account caller contract 301 executes the following processing. The executor account contract 302 executes the target function of the target contract 303 by inputting the input data to the target function as an argument, on the basis of the address of the target contract 303 and the identifier of the target function, which are included in the transaction that the user desires to execute (step S363). The delegation processing is ended. The processing subsequent to step S304 in the procedure of the processing illustrated in the sequence diagram of FIG. 8 is not executed.

A configuration is impractical in which the account caller contract 301 and the executor account contract 302 described above allow a transaction execution instruction from all blockchain accounts in the blockchain system 300. Therefore, the executor account contract 302 may be set to accept only the instruction from the account caller contract 301, and the account caller contract 301 may store the account (the relayer) having an execution instruction privilege of the own call function in the form of whitelist. As with Example 3 and Example 6, if the account caller contract 301 and the executor account contract 302 are the same instance, the account caller contract 301 (the executor account contract 302) may store the account (the relayer) having the execution instruction privilege in the form of whitelist and may be capable of rejecting a delegation transaction from an account not having a privilege.

In the transaction delegation processing illustrated in sequence diagram of FIG. 8 to FIG. 13, an example has been described in which the validity of delegation content is validated by the electronic signature with respect to the content of the transaction (user tx) that the user desires to execute and the delegation condition. However, the validation is not limited to the electronic signature. The validation processing of step S301 may be omitted by setting the transaction that the user desires to execute to pass some authentication in advance. In addition, instead of the validation processing of step S301, another validation contract may be deployed in the blockchain system 300, and the processing may proceed after being validated with the validation contract. Further, instead of the validation processing of step S301, in the procedure of the delegation transaction creation processing in FIG. 7, the second device 2 of the relayer may validate the electronic signature received from the first device 1 outside the blockchain system 300.

The method of collecting the delegation fee also has other variations. In the sequence diagram of FIG. 8 and FIG. 9, the executor account contract 302 executes the payment processing with respect to the delegation fee token management contract 304.

However, another contract having a license from the user, for example, may be performed in the format where the account caller contract 301 executes withdrawal processing in the delegation transaction delegation processing. In addition, the delegation fee is not collected in the delegation processing, and the collection of the delegation fee may be attained in the format of performing advanced payment/future payment with respect to the execution of the delegation transaction for a certain period of time (tx delegation) at once. In a service that allows the user to log in and manages a wallet (the private key) of the user in a centralized manner, it is also possible to support the advanced payment/the future payment with the legal currency when collecting the delegation fee. In a case of collecting the delegation fee by the future payment, the asset held by the user may be collateralized in consideration of a risk that the payment is not executed. Here, the asset may be an asset (a token) that can be distributed in the blockchain system 300. The asset may be various assets (such as cash, securities, and real estate) outside the blockchain system 300. In a case of the asset that can be distributed in the blockchain system 300, the collection of the delegation fee can be enforced without a risk such as an agent and contract abandonment by making a contract itself relevant to the future payment and the collateralization into a smart contract, which is a great merit.

According to the system 100 described above, the user is capable of executing the transaction in the blockchain system 300 without holding the utility token or the fee token. Accordingly, a burden on the user is greatly reduced. The relayer is capable of collecting the delegation fee with an arbitrary token (delegation fee token). In the present disclosure, the delegation fee token management contract 304 is capable of executing the processing described above without performing modification for supporting the transaction delegation, thereby using a plurality of tokens already existing in the blockchain system 300. The delegation fee token, for example, can be collected with the existing token based on standards such as ERC20, ERC721, or ERC1155, in Ethereum. In a case of ERC1155, the delegation fee token can also be collected with a plurality of types of tokens. That is, a burden on the user can be eased by flexibly adjusting a procedure for collecting the transaction delegation fee from the user. It is obvious that it is also possible to completely assume the delegation fee, and in a case of completely assuming the delegation fee, a burden is considerably reduced.

Even in a case of validating the validity of the delegation content by using the electronic signature in order to safely carry out the delegation to the relayer (a person to be delegated) from the user, the user may perform the processing of generating the electronic signature with respect to the transaction (user tx) that the user desires to execute only once at the beginning. Accordingly, regarding the delegation of the transaction (user tx), approval processing is not required again in the subsequent processing, and a general transaction is executed without any change. Therefore, a work burden of the user is not increased by the transaction delegation of the present disclosure.

According to the system 100 of the present disclosure, the relayer is capable of executing the transaction (user tx) designated from the blockchain account (executor account contract) of the user without known confidential information of the user (such as the private key that is stored in the first device 1 of the user). The user is capable of protecting the own confidential information while allowing the relayer to use the privilege of the executor account contract 302. If the user desires to allow another person (the relayer) to use the privilege of the user, it is necessary for the user to inform another person of the confidential information of the user (such as that private key that is stored in the first device 1 of the user), but the delegation to another person can be performed while protecting the confidential information.

It is possible to prevent the relayer from modifying the content of the transaction (user tx) that the user desires to execute. For example, the user may perform the validation of the content of the transaction that the user desires to execute with the smart contract by adding the electronic signature to the content. The transaction (user tx) desired by the user and the collection of the delegation fee can also be atomically executed. A possibility that the user is disadvantaged by the fraud of the relayer to be delegated can also be reduced. It is possible to greatly contribute to fraud prevention. If there is a problem that the delegated delegation transaction (delegation tx) is not executed, it is also possible to handle the problem through another relayer. In order to atomically execute the transaction (user tx) that the user desires to execute and the collection of the delegation fee, it is necessary for the user to hold a token (delegation fee token) that can be used as some delegation fees in the blockchain system 300. By applying a stable coin to the token that can be used as the delegation fee, the user can also be protected from a price decrease risk of the token that can be used as the delegation fee. In particular, a legal currency-based stable coin is a non-speculative token of which the price is stable, and thus, is an asset that is easily used by even a user who is not familiar to various tokens distributed in the blockchain system 300 and has a low holding risk, and has a high utility value.

The relayer to be delegated, for example, may be a company that has been approved through an official procedure from the central government. It is also possible for the company to take responsibility for the management of a crypto-asset (a private key) of a customer and to execute the transaction (user tx) desired by the user. Note that, the transaction desired by the user can also be executed on the basis of the distribution of the fee token or the utility token in advance to a customer account of the user under the management of the company. However, it is obvious that a fee token is also required for the transaction processing of executing the distribution of the fee token or the utility token to the user, and a given length of time is also required for the approval of the transaction. Continuous distribution to all customers requires a high financial and temporal cost.

According to the system of the present disclosure, in a case of aggregating fee token or the utility token in the account (the relayer, for example, a finance company) for executing the delegation transaction (delegation tx), the distributed processing is not required, and thus, the financial and temporal cost can be reduced. This is also a great merit for the company to be the relayer.

The relayer to be delegated is not limited to the company that has been approved as described above. Even a medium-size company or an individual can be the relayer. By applying the system of the present disclosure, the relayer is capable of safely assuming the burden of the user. Until now, it has not been possible for the customer (the user) to be involved with the asset management, and thus, it has been necessary for the customer to handle the work burden and the fee burden, but the burden on the customer can be reduced by the relayer handling the burden. If it is not possible to completely assume the fee, it is also possible to flexibly distribute the burden from the customer by collecting the crypto-asset handled by the customer in the blockchain system 300 or the delegation fee outside the blockchain system 300. In the payment of the delegation fee, some incentives in a service that is attained by an application in the blockchain system 300 and is enjoyed by the user may be set. Accordingly, it is also possible to construct a scheme in which the customers (the users) pay the delegation fees to each other to execute the transaction delegation.

A target to which the system 100 (the method) of the present disclosure is applied, for example, is a distributed application (Dapps) operator or a wallet application developer. For example, in game Dapps, even though there is a probability that general users who are not familiar to the blockchain system 300 are imported as a user of the game, the procedure and the management for paying the fee token are complicated. By applying the system 100 of the present disclosure, it is possible to lower a threshold for allowing even a user who is not capable of managing the fee token to become the user of the game. In addition, if a specific token issued by an operator as part of a marketing campaign is distributed to the user without any charge and if such a specific token is transacted by the user in the blockchain system 300, there is an exchange that requires the fee token, in addition to the game. In such a case, by applying the system 100 of the present disclosure, it is possible to accelerate the use of the service for the user and the operator.

The system 100 (the method) of the present disclosure may be applied not only to the Dapps operator and the wallet application developer but also to B2B billing of a cloud vendor or a system integration (SI) vendor for providing a relevant service of the blockchain system 300. In a dissemination phase of the blockchain system 300, as with the user of Dapps, most customers of each of the vendors are not also familiar to the blockchain system 300, and are not capable of differently using a plurality of tokens. In order to operate a service constructed by utilizing the blockchain system 300, it is expected that the necessity of a scheme for the vendor to assume the payment of the fee token or the utility token increases. Even in such a use case in an enterprise domain, it is extremely effective to use the legal currency-based stable coin.

If the transaction delegation (tx delegation) using the system 100 (the method) of the present disclosure is interpreted as a "transaction between the fee token or the utility token and the delegation fee token that can be collected from the user", a transaction market thereof is generated. Even though there are still problems in the dissemination when considering the matching of the transaction, the requisites of the transaction market are satisfied only by forming an open transaction pool. The transaction market functioning to be the relayer can also be established as business.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A transaction delegation method, implemented using a blockchain system, wherein a target contract is activated, the transaction delegation method comprising:
   receiving delegation data, by a second device, through communication outside the blockchain system from a first device, the delegation data comprising at least data for determining the address of the target contract in the blockchain system and condition data for configuring the transaction to be executed by the target contract;
   creating a delegation transaction, by the second device, by embedding the data for determining the address of the target contract in the blockchain system and the condition data for configuring the transaction into the delegation transaction;
   broadcasting, by the second device, the delegation transaction with payment of a fee token or a utility token required for executing a transaction to the blockchain system; and
   executing, by the target contract, the transaction on the basis of the delegation transaction broadcasted to the blockchain system.

2. The transaction delegation method according to claim 1, wherein the condition data includes identification data of a target function in the target contract, and argument data to be passed to the target function.

3. The transaction delegation method according to claim 2, wherein the delegation transaction includes the data for determining the address of the target contract, the identification data, and the argument data in a nested structure, and
   the delegation transaction includes an address of the target contract that executes the desired transaction of the user, or data for determining the address.

4. The transaction delegation method according to claim 1, wherein the delegation transaction includes a function for calling account caller contract, and
   the account caller contract instructs the executer account contract to call the target contract to execute the desired transaction on the basis of the delegation transaction.

5. The transaction delegation method according to claim 4, wherein the delegation transaction includes a condition of a delegation fee to the second device, the account caller contract determines the delegation fee on the basis of the delegation transaction, and
   a transaction for paying the determined delegation fee is requested to a delegation fee token contract for executing payment to a relayer from an executer account.

6. The transaction delegation method according to claim 5, wherein the delegation fee is different from the fee token or the utility token.

7. The transaction delegation method according to claim 4, wherein the account caller contract allows a call based only on the delegation transaction from the second device including account data of an account list that is stored in advance.

8. The transaction delegation method according to claim 1, wherein the delegation transaction includes a function for calling the executer account contract, and the executer account contract contacts the target contract to execute the desired transaction.

9. The transaction delegation method according to claim 8, wherein the delegation transaction includes a condition of a delegation fee to the second device, the account caller account contract determines the delegation fee on the basis of the delegation transaction, and a transaction for paying the determined delegation fee is requested to a delegation fee token contract for executing payment to the second device from the account of the user.

10. The transaction delegation method according to claim 9, wherein the delegation fee is different from the fee token or the utility token.

11. The transaction delegation method according to claim 9, wherein the account caller contract allows a call based only on the delegation transaction from the second device including account data of an account list that is stored in advance.

12. A transaction delegation system, comprising:
- a blockchain system that comprises a plurality of computers, wherein a target contract is activated;
- a first device comprising a processor and a memory; and
- a second device comprising a processor and a memory, wherein
- the first device transmits delegation data to the second device for delegating execution of a transaction in the blockchain system through communication outside the blockchain system, the delegation data comprising at least data for determining the address of a target contract in the blockchain system and condition data for configuring the transaction to be executed by the target contract,
- the second device creates a delegation transaction by embedding the data for determining the address of the target contract in the blockchain system and the condition data for configuring the transaction into the delegation transaction,
- the second device broadcasts the delegation transaction with payment of a fee token or a utility token required for executing the transaction to the blockchain system, and
- the target contract executes the transaction on the basis of the delegation transaction broadcasted to the blockchain system by the second device.

13. A computer readable non-transitory recording medium recording a computer program causing a computer to execute processes of:
- receiving delegation data comprising at least data for determining the address of a target contract in the blockchain system and condition data for configuring the transaction to be executed by the target contract;
- creating a delegation transaction by embedding the data for determining the address of the target contract in the blockchain system and the condition data for configuring the transaction into the delegation transaction; and
- broadcasting the delegation transaction with payment of a fee token or a utility token required for executing the transaction to the blockchain system.

* * * * *